Jan. 29, 1935.  J. F. ENGLAND ET AL  1,989,272
METHOD AND APPARATUS FOR MAKING AN ARTICLE OF FOOD
Filed May 14, 1932  6 Sheets-Sheet 1
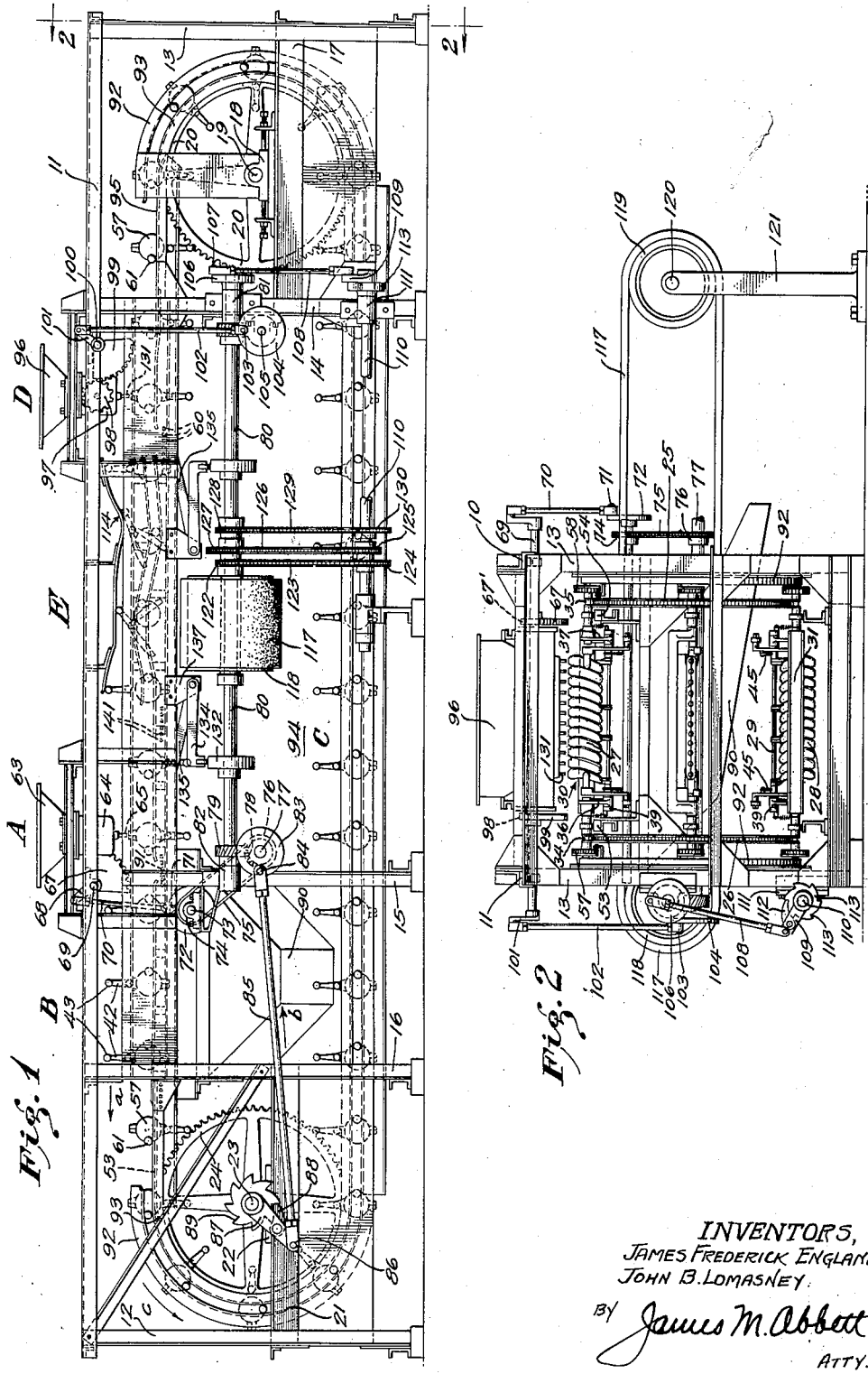
INVENTORS,
JAMES FREDERICK ENGLAND.
JOHN B. LOMASNEY.
BY James M. Abbott
ATTY.

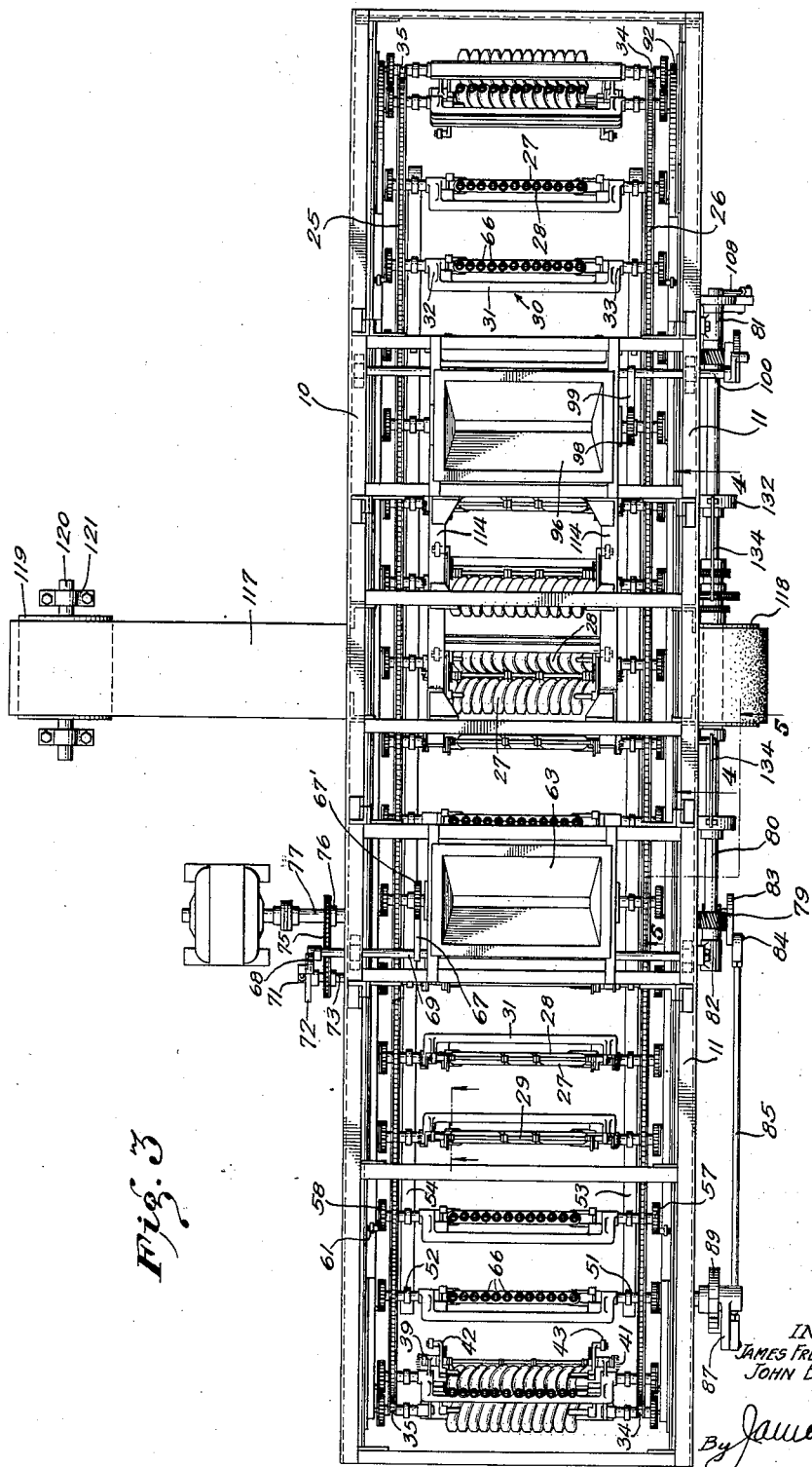

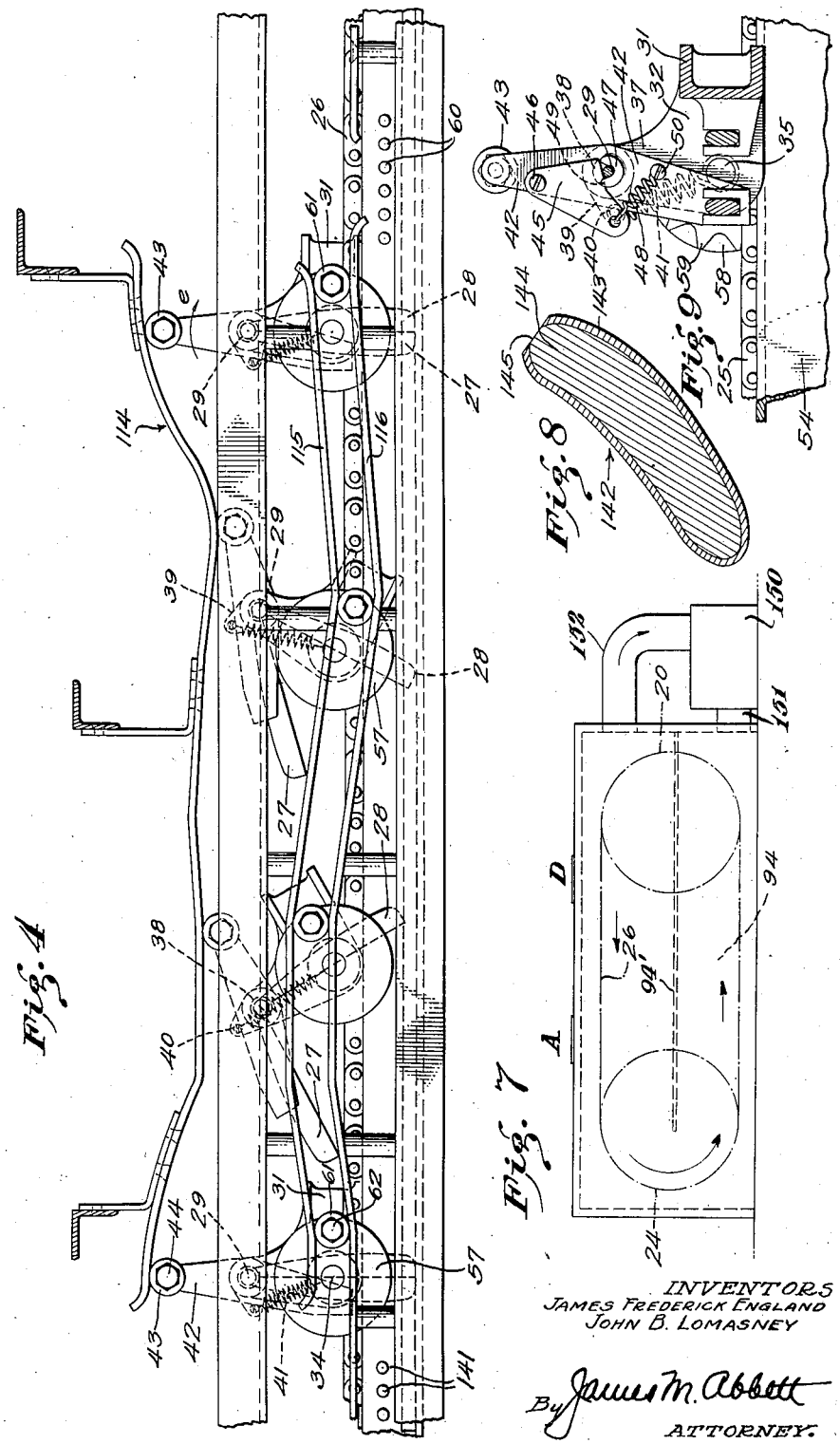

Jan. 29, 1935.  J. F. ENGLAND ET AL  1,989,272
METHOD AND APPARATUS FOR MAKING AN ARTICLE OF FOOD
Filed May 14, 1932    6 Sheets-Sheet 4
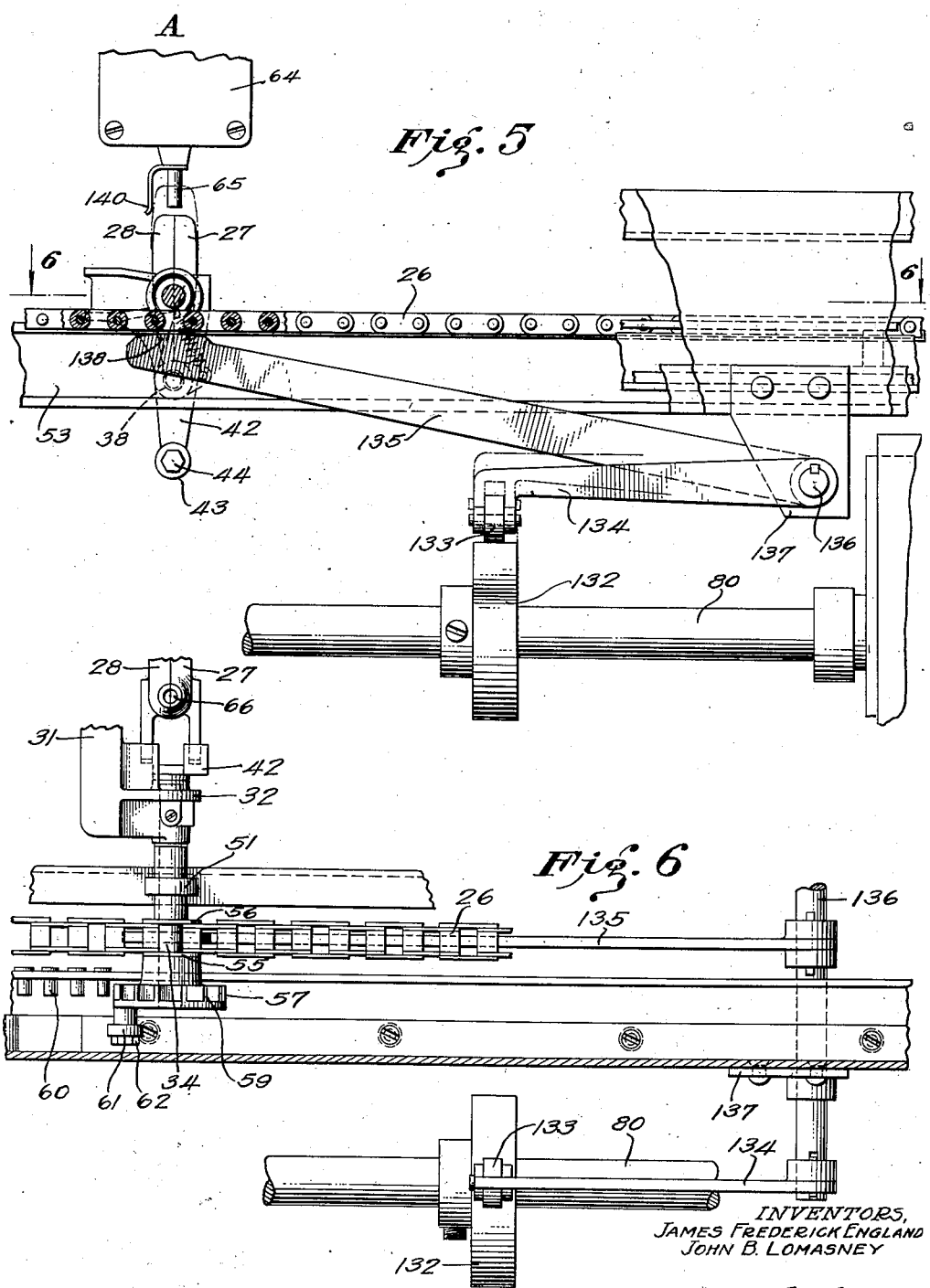
INVENTORS,
JAMES FREDERICK ENGLAND
JOHN B. LOMASNEY
By James M. Abbett
ATTORNEY.

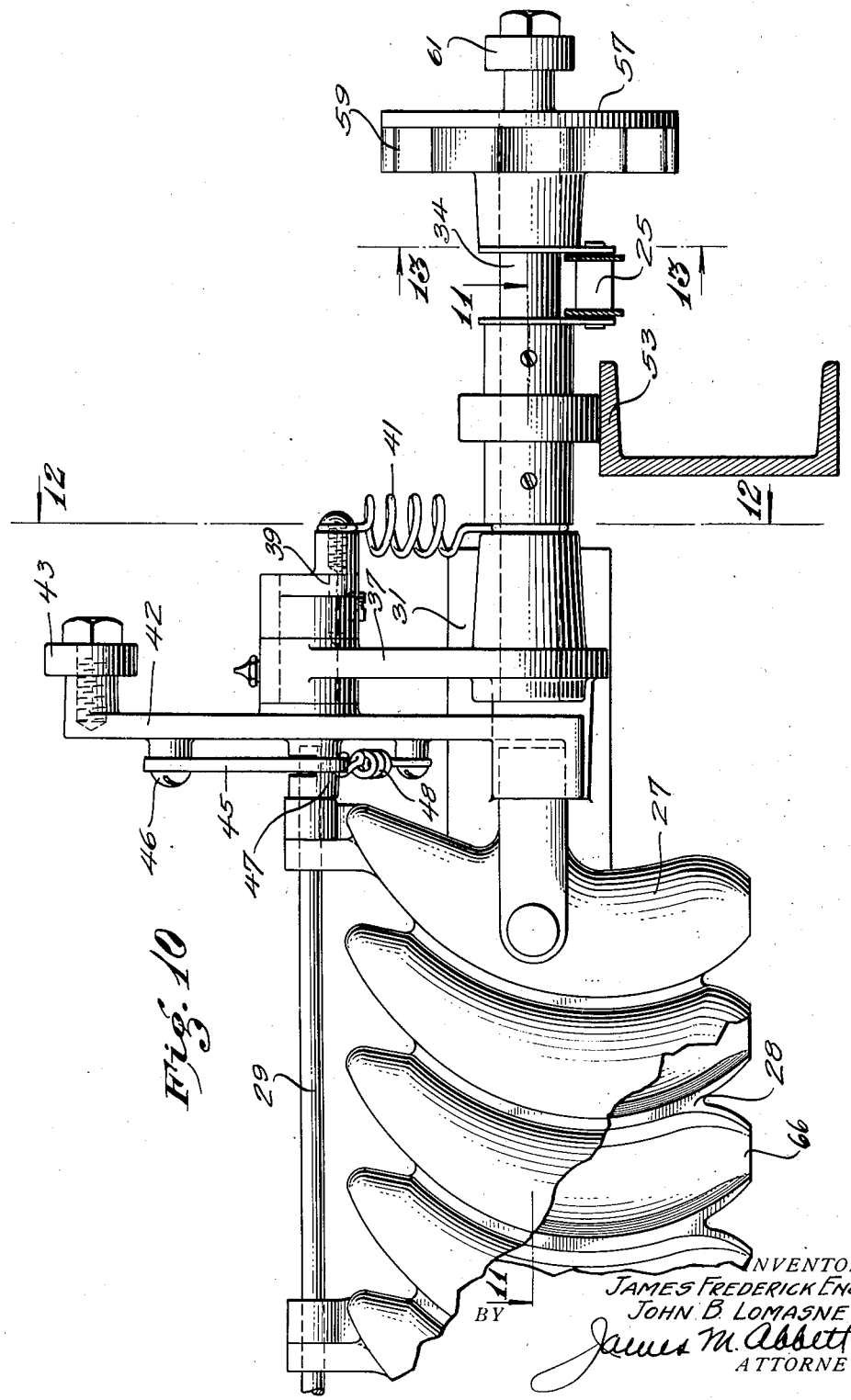

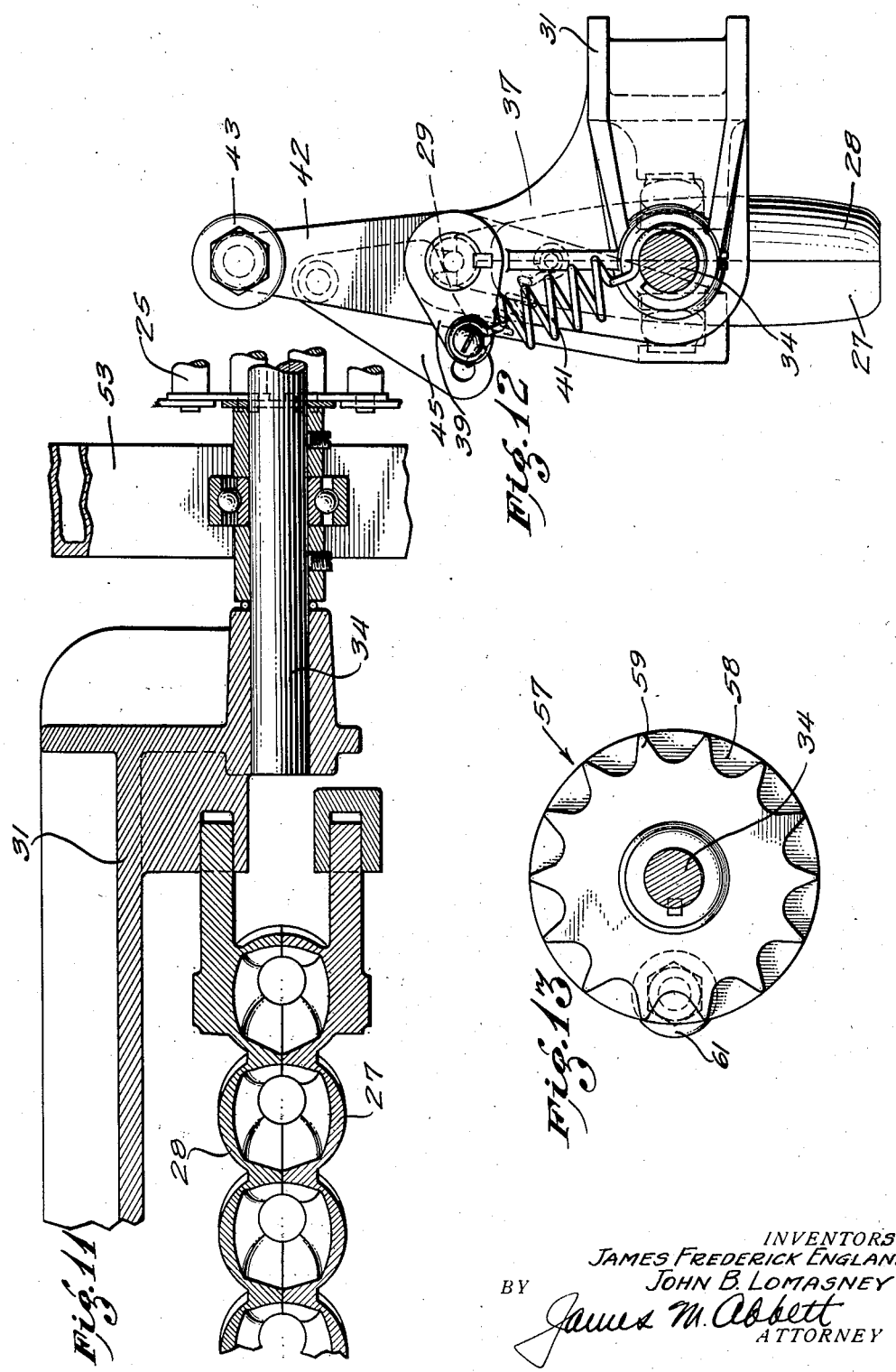

Patented Jan. 29, 1935

1,989,272

UNITED STATES PATENT OFFICE 1,989,272

METHOD AND APPARATUS FOR MAKING AN ARTICLE OF FOOD

James Frederick England and John B. Lomasney, Long Beach, Calif., assignors to Eng-Lo Associates, Ltd., Long Beach, Calif.

Application May 14, 1932, Serial No. 611,368

8 Claims. (Cl. 107—1)

This invention relates to a method and apparatus for making an article of food, and particularly pertains to means for forming an article of food comprising an outer shell of candy or like edible material and a filling of frozen product.

It is the principal object of the present invention to provide a method and apparatus by which composite confections or food products may be made and which products comprise an outer coating of an edible material which is normally hard and substantially permanent under conditions of room temperature, and a filling of edible material such as ice cream or other frozen food products.

The present invention contemplates the provision of a carrier by which molds may be successively disposed in operative relation to a hopper containing coating material and to a hopper containing filling material; said molds being carried through zones within which the atmosphere is at freezing temperature and while within the first of which zones the coating material is caused to congeal to a predetermined thickness within the mold to form a shell, and in the second of which zones the coating is caused to shrink and separate from the mold prior to the introduction of a filling material thereto, after which the filling material is automatically introduced into the formed shells and the finished products then ejected from the molds.

The invention is illustrated by way of example in the accompanying drawings, in which:—

Figure 1 is a view in side elevation showing the complete machine with which the invention is concerned.

Fig. 2 is a view in end elevation showing the complete machine as viewed in the direction of the arrows 2 in Fig. 1.

Fig. 3 is a view in plan showing the completely assembled machine.

Fig. 4 is an enlarged fragmentary view showing the steps of operation during which time the molds are opened to discharge the finished products and are again closed.

Fig. 5 is an enlarged fragmentary view showing the means for lifting the molds into filling relation to the spouts of one of the hoppers and indicates the lifted position of the mold by dotted lines.

Fig. 6 is an enlarged fragmentary view in plan showing the mold lifting mechanism as disclosed in Fig. 5.

Fig. 7 is a view in diagram indicating the various cooling stations and the refrigeration compartments associated therewith.

Fig. 8 is a view in longitudinal section and elevation showing a product which may be made by the present invention.

Fig. 9 is a fragmentary view in section and elevation taken at the end of one of the mold structures and showing the manner in which the mold is detachably secured in position.

Fig. 10 is an enlarged fragmentary view in elevation taken transversely of one of the mold sections and its operating unit.

Fig. 11 is a longitudinal section through the unit as seen on the line 11—11 of Fig. 10.

Fig. 12 is a view in section and elevation showing the mold unit and its supporting frame as seen on the line 12—12 of Fig. 10.

Fig. 13 is a view in transverse section showing the rotating element of the mold as seen on the line 13—13 of Fig. 10.

Referring more particularly to the drawings, 10 and 11 indicate upper horizontal rails of a frame structure within which the apparatus of the present invention is housed. These rails are supported at their opposite ends by pairs of corner posts 12 and 13 and are supported intermediate their ends by pairs of posts 14, 15, and 16. Extending horizontally between the corner posts and the intermediate post 14 is the structural member 17 carrying an adjustable journal box 18 within which the shaft 19 of a sprocket wheel 20 is housed. At the opposite end of the frame and between the corner posts and the uprights 16 a frame member 21 is mounted carrying a journal box 22 receiving shaft 23 of a sprocket wheel 24. The sprockets 20 and 24 are arranged in pairs upon the shafts 19 and 23 and are spaced from each other so that the sprockets 20 and 24 at the sides of the machine will be in parallel vertical planes. The sprockets carry sprocket chains 25 and 26 which are led around the sprockets in aligned vertical planes and which chains are of sufficient length to provide suitable intervals of travel for the various molds used in the machine, and in a manner to insure that the molds will remain in various operating zones for a predetermined period of time. Sprocket chains as arranged provide two horizontal runs for the molds.

The molds are in two complementary sections 27 and 28. In the present instance, these mold sections are of a configuration to form a confection having the general shape of a banana, and are hinged together on their upper edges upon a hinge pin 29. This pin extends transversely of the machine and at right angles to the conveyer chains 25 and 26. It is intended that the mold units may be interchanged in the machine so that articles of different configurations may be formed, or so that defective molds may be readily replaced. For this purpose a mold frame 30 is provided and extends transversely of the machine and between the conveyer chains 25 and 26. These mold frame members are U-shaped, having a transverse portion 31 and arms 32 and 33 at the opposite ends thereof. The arms of the frames receive shafts by which the arms are operatively connected to the conveyer chains 25 and 26. These shafts are indicated in Fig. 2 of the drawings by the numerals 34 and 35. The lever arms 36 and 37 are disposed at the rear of the frame arms 32 and 33, respectively, and carry crank pins 38 upon which are mounted spring crank arms 39. These arms are provided at their free ends with fastening screws 40 to receive an end of a coil spring 41. The opposite end of this coil spring is secured upon the shaft 34 or 35 as the case may be.

Pivotally mounted upon the crank pins 38 are trip arms 42 which extend at opposite sides of their pivotal connection. The lower ends of said arms being pivoted with relation to frame structure 30 and the upper ends being provided with trip rollers 43 secured in position by cap screws 44. These rollers engage a trip track which will be hereinafter described.

A lock lever plate 45 is pivotally secured to each of the arms 42 by a screw 46. This plate extends outwardly and rearwardly of the travel arm and provides lock means by which the hinge pin 29 of a mold is held in a seated position within a mounting boss 47 formed upon the inner opposing faces of the trip levers 42.

Tension springs 48 are provided to be secured at the outer free ends of the lock lever plates 45 to hold the lock plates in their seated position within a recess 49 of a boss 47. The opposite ends of the tension springs 48 are secured by screws 50 to the lower portion of lever 42. It will, therefore, be evident that the frame structure 30 may pivot around the axes of the pins 38, and that it in turn may have relative movement around the axis of the shafts 34 and 35. The oppositely and outwardly protruding ends of the shafts 34 and 35 are provided with anti-friction rollers 51 and 52, respectively. These rollers ride along tracks 53 and 54, respectively, while traveling along the upper run of the conveyer chains. By reference to Fig. 1 it will be seen that these tracks terminate at points adjacent to the vertical plane of the axes of the sprocket chains 20 and 24.

The shafts 34 and 35 extend further outwardly and receive shackle plates 55 and 56 spaced from each other on the shaft and between which the sprocket chains 25 and 26 are positioned at opposite ends of the structure. On the portion of the shafts 34 and 35 extending outwardly beyond the plane of the sprocket chains are disposed trip discs 57 and 58, respectively. These discs are formed with a plurality of teeth 59, which engage trip pins 60 disposed along the path of travel of the conveyers and are encountered when certain operations are to be accomplished.

The discs 57 and 58 are each fitted with a roller 61 which are eccentrically disposed with relation to the axes of the discs upon roller pins 62. The rollers 61 are normally in positions in advance of the axis of the shafts 34 and 35 and engage cam tracks at different points along their path of travel in the manner and for purposes to be hereinafter pointed out.

The mold units comprising the sections 28 and 29 and the frames upon which they are mounted are carried successively to a coating station A, a coating discharge station B, a shelling station C, a filling station D, and a final discharge station E. By reference to the arrow "a" in Fig. 1, it will be seen that at coating station A there is a hopper 63 within which a coating material may be placed. This material has the general characteristics of a candy coating such as is used on bon bons, although it is to be understood that the composition of this material is immaterial to the present invention. The hopper fits into a discharge valve structure 64, fitted with a plurality of downwardly projecting discharge nozzles 65 spaced from each other so as to register with the several openings 66 at the tops of the mold units. A gear segment 67 actuates the discharge valve mechanism 64 and causes a measured quantity of the coating material to be ejected from the hopper 63 at each actuation. A lever arm 68 is secured to the gear segment 67 and upon the opposite side of its pivotal center 69. This lever arm provides an attachment for a pitman rod 70 which extends downwardly and engages a crank 71 on a crank disc 72. This disc is mounted upon a horizontally extending jack shaft 73 driven through a sprocket 74 at a sprocket chain 75 from a sprocket wheel 76 mounted upon a transverse drive shaft 77. This drive shaft carries a suitable worm gear 78 in mesh with a complementary worm gear 79 mounted upon a longitudinally extending shaft 80 supported upon uprights 14 and 15 in bearings 81 and 82. The transverse drive shaft 77 carries disc 83 upon which a pin 84 is mounted. This pin receives the end of a pitman rod 85, the opposite end of which rod is pivotally connected at 86 with an intermittent feed lever 87 which is freely mounted on the sprocket shaft 23. This feed lever carries a ratchet dog 88 engaging ratchet teeth 89 of a ratchet wheel fixed to the shaft 23 and by which this shaft is rotated. Due to this arrangement sprockets 20 and 24 and the sprocket chains 25 and 26 will be intermittently driven in a step by step motion so that the molds may be successively moved to the various operating stations and after pausing for a predetermined period of time may then be moved from the operating stations and along their paths of travel.

After a mold unit has paused beneath the nozzle 65 of the feed hopper 63 and has there received a complete filling of the coating material, it is moved to station B and over the pan. As it moves to this station the teeth 59 of the members 57 and 58 will engage a series of pins 91 extending from the side rails 10 and 11, which will cause the members 58 and 59 and the pins to act as a rack and pinion structure, causing the mold and its frame to make a revolution of 180° around the axis of the shafts 34 and 35, at which time the intermittent movement of the conveyer chains will be interrupted to permit the molds to stand in their inverted positions and to allow the uncongealed coating material in the center of the mold to drain therefrom and to leave a solidified outer shell of a thickness as may be determined by the temperature of the compartment in which station B occurs, and the period of time the mold remains in this compartment before it is inverted.

The next intermittent movement of the structure will cause the molds to return to their original downwardly hanging position as they move toward and around the sprocket wheels 24. Attention is directed to the fact that during the semicircular arc of travel of the molds around the sprocket wheel 24 the rollers 61 travel between guide rails 92 and 93 to thus maintain the molds in rigid radial relation to the sprocket as they travel therearound. The chilling station C is represented by a relatively long tunnel 94 through which the lower run of the conveyer chains extend and within which the shells of coating are maintained at a relatively low degree of freezing temperature. Experience has shown that by chilling the shells within the molds the shells tend to contract and to become loosened, so that when the finished product is discharged from the molds they will fall away without any adherence to the mold surface.

The guide rails 92 and 93 extend along the path of the lower run of the conveyer chains 25 and 26 and upwardly around the sprockets 20 to form a guide for the mold structures as they move to the upper run of conveyer chain. Tracks 95 extend along the upper run of the conveyer chains and receive the rollers 61 carried by the members 57 and 58. The tracks 95 thus support the rollers 61 so that their axes are substantially in the same horizontal plane with the axes of the members 57 and 58. These tracks extend beneath and beyond the filling station D. This station comprises a hopper 96 and a feed valve mechanism 97, similar to the feed valve mechanism 64 at station A. Since the valve structures 64 and 97 are of common design the details of their construction need not be here described. As shown in Fig. 1 of the drawings, feed valve structure 97 is provided with a gear 98 in mesh with a gear segment 99 carried upon a pivot shaft 100 and operated by a lever 101. This lever is secured to a pitman rod 102 which extends downwardly to engage crank pin 103 of a crank disc 104 which is mounted upon a transverse shaft 105 driven from the shaft 80. The shaft 80 is provided at the end adjacent the sprockets 20 with a crank disc 106 carrying a crank pin 107 provided with a connecting rod 108. This connecting rod extends downwardly to a crank arm 109 mounted upon a lower drive shaft 110 carried in side bearings 111. The lever 109 is provided with a dog 112 which may be brought to engage teeth of a ratchet wheel 113 carried on the shaft 110 and by which this shaft is intermittently rotated increments of its circumference.

At the station D filling material such as ice cream is forced into the shell within the mold while this filling material is in a plastic condition. The filled mold then moves forwardly to the discharge station E, the details of which are shown in Fig. 4 of the drawings, and along which station the halves of the mold are separated as the roller 43 engages an upper track cam 114 and the roller 61 engages a pair of side rails 115 and 116. These tracks and guide rails are positioned along the path of the chain and above a transversely disposed conveyer belt 117 which is provided to receive the finished products discharged from the molds and to carry them away. This conveyer belt is led around a pulley 118 mounted upon the shaft 80, and a pulley 119 mounted upon a shaft 120 carried by standards 121. By reference to Figs. 2 and 3 of the drawings, it will be seen that the pulley extends transversely of the machine between the runs of the conveyer chain and to a point therebeyond so that the finished product may be carried to suitable dispensing devices, or may be carried into refrigeration apparatus for further freezing.

The pulley 118 around which conveyer belt 117 leads is a drive pulley and is freely mounted upon the shaft 80. It carries a sprocket wheel 122 driven by a sprocket chain 123 which leads around a sprocket wheel 124 freely mounted upon the shaft 110. Secured integrally to the sprocket 124 is a sprocket 125 which carries a chain 126 leading upwardly around a sprocket 127 which is freely mounted upon the shaft 80. This sprocket is secured to a sprocket 128 carrying a chain 129 leading around a sprocket 130 fixed to the shaft 110.

It is intended that the belt 117 shall move at a greater rate of speed than the rest of the machinery so that the articles deposited upon the belt from the molds will be spaced apart a considerable distance along the belt.

In order that the molds will properly register with the nozzles 65 of the feed hopper 63 at coating station A and the nozzles 131 of the hopper 96 at the filling station D, it is necessary to lift the molds into close proximity to the lower ends of the nozzles. This lifting mechanism is particularly shown in Fig. 5 of the drawings, and while this view only discloses the mechanism used for lifting the molds at the coating station A, it will be understood that an identical structure is used for lifting the molds at the filling station D. The lifting mechanism comprises a cam 132 fixed upon the shaft 80 and against the periphery of which a cam roller 133 rests. Cam roller 133 is rotatably supported at the lower end of a bracket 134 carried by the lifting arm 135. This arm is pivoted at one end upon a pivot 136 mounted upon a fixed bracket 137. The opposite end of the arm is free and is provided with projecting portions 138 and 139 adapted to contact with the under face of the conveyer chains 25 and 26. It is to be understood that the levers 135 are arranged in pairs and that they move in unison. One of said levers being disposed under the conveyer chain 25 and the other disposed under the conveyer chain 26, as indicated in Fig. 6 of the drawings. The upward swinging movement of the arms simultaneously flexes the conveyer chains and causes a mold unit to be lifted from the solid line position shown in Fig. 5 to the dotted line position. During this lifting motion the mold encounters a guide flange 140 which is on the advance side of the nozzles and tends to guide the molds into proper register with the nozzles irrespective of any stretch which has occurred in the chain and which might tend to prevent the molds from properly registering with the nozzles. Attention is directed to the fact that the lower curved edge of the flange 140 extends lower than the plane of the upper end of the molds when the molds are in their traveling positions. This edge will act as a scraper and will stand in the path of the upper ends of the molds so that any surplus material projecting above the end of the mold will be scraped off as the molds pass beneath the scraper.

In operation of the present invention, driving power is applied to the transverse drive shaft 77 in any suitable manner, such for example as by directly connecting a motor therewith. The shaft 77 drives crank disc 83 and through its pin 84 reciprocates the pitman rod 85. This rod in turn operates the lever 87 so that the dog 88 will engage a tooth of the ratchet wheel 89 at each time the pitman rod 85 moves in the direction of the arrow "b" as indicated in Fig. 1 of the drawings. This action will cause the sprockets 24 to rotate in the direction of the arrow "c", and will thus successively move the molds comprising sections 27 and 28 to and away from the coating station A. As the closed molds move to the coating station A, cams 132 lift the lever arms 35 and cause an assembled mold to be raised into filling position to the row of nozzles 65 which communicate with the valve structure 64 of the hopper 63. Operating in synchronism with this device is the shaft 73 driven from the transverse drive shaft 77 by the chain 75. This shaft operates a crank disc 72 which in turn moves the pitman rod 70 to rotate the shaft 69 upon which is carried the pair of gear segments 67. These segments act upon pinions 67' to operate the valve mechanism 64 and to cause measured quantities of coating material to be ejected from each of the nozzles 65 and into a mold cavity of the mold structure comprising closed sections 27 and 28. After this filling operation has been completed the cam 132 will permit the levers 135 to be lowered. The conveyer chains 25 and 26 will then be intermittently moved to carry the mold unit away from the coating station and to the cooling and emptying station B. As the mold moves from its filling position its upper edge must pass beneath the lip of flange plate 140, which will remove surplus material. As previously described, a set of pins 91 is disposed along the side lines of the mold and in the paths of the gears 57 and 58 which are fixed upon the shafts 34 and 35 of the mold frames 31, and will cause the molds to be rotated a half of a revolution so that their opened ends will be inverted to permit all of the coating to empty from the molds save that proportion of coating which has solidified upon the mold wall for a thickness determined by the period and temperature at which it has been chilled.

Upon successive intermittent movements of the conveyer chains 25 and 26 the mold unit will be rotated to its normal position with the filling mouth disposed uppermost and with a thin shell of coating material conforming to the contour of the mold and contained therein. The mold unit with its shell of coating material is then carried through the chilling station C along the lower run of the conveyer chains where the shell will be chilled and will contract so that it will not adhere to the surface of the molds. After successive intermittent moves of the conveyer chain the mold with its shell will be presented at the filling station D. At this point a lifting mechanism such as that shown in Fig. 5 of the drawings will be brought into operation so that levers 135 will lift the molds into filling relation to the nozzles 131. Filling material in a plastic or semi-solid condition is then ejected into the shells carried by the molds when the valve mechanism 97 is operated. This operation is brought about through the valve gear 98 and its segment 99 and the driving mechanism connected therewith which includes the pitman rod 102, the crank disc 103 and the shaft 105 therefor.

The cam 132 then permits the lever 135 to swing downwardly. The mold unit will then be retracted from its filling position with relation to the nozzles 131 and the filled shell and mold will then move toward the releasing structure, and the gears 57 and 58 will engage the pins 60 which extend from the side rails. This will cause the molds to make a rotation of 180° so that the mouths of the mold units will be extending downwardly. The mold then moves to a downwardly inclined portion of the track 114 where the rollers 43 of its arms 42 will cause the mold section 27 to swing outwardly and upwardly as the mold opens. This swinging movement takes place around the shaft 29. At the same time the rollers 61 carried by the discs 59 will engage tracks 115 and 116 and will be swung downwardly from their normal horizontal plane in horizontal alignment with the axis of the shafts 34 and 35. As this downward movement proceeds, the mold frame 31 will be dipped downwardly so that the mold section 28 will be inclined in a slightly forward direction. The mold unit then continues along the trackway 114 while the mold section 27 is held in an upper position and while the rollers 61 swing to positions above the normal horizontal plane of their axes. This will cause the pivot shaft 29 to swing in advance of the path of travel of the mold unit and the lower end of the mold section 28 to swing rearwardly of the path of travel so that the mold will be opened and the article permitted to drop onto the conveyer belt 117. An upwardly flaring portion of the guide track 114 and a downwardly inclined portion of the guideways 115 and 116 will restore the mold sections 27 and 28 to their original positions, closing the mold and permitting the closed mold structure to advance toward the coating station A where the gears 57 and 58 will encounter a set of rack pins 141 where the mold will be rotated a half revolution around the axis of shafts 34 and 35 to restore it to a filling position so that it will be properly presented to the coating nozzles 65.

The food products which have been delivered upon the conveyer 117 may be placed in containers, such; for example, as individual "Cellophane" wrappers, and may then be passed on to suitable refrigerating apparatus by which their temperature will be sufficiently lowered to maintain them in a hardened condition during their subsequent transit.

The present invention shows the molds as being of a form to make a product simulating the shape of a banana as indicated at 142 in Fig. 8 of the drawings. Here it will be seen that an outer shell of coating 143 has been formed and that it has been filled with a filling 144. The filling may be of any preferred material, but in the present instance has been described as being ice cream. It will be noted that the upper end of the product is formed with an opening 145 in the shell through which the filling material may be introduced to the shell.

Attention is directed to the fact that the levers 42 are pivoted upon the shaft 37 and 38 and that they support mold sections 27. The two mold sections are pivoted together upon their rods 29 which rods fit in the seats of bosses 47 while lugs 146 on the lower corners of the mold sections 27 fit within channel members 147 carried at the lower ends of the levers 42. Similar channel pockets 148 are formed on the arms of the mold frame 30 and receive lugs 149 of the mold sections 28. This provides a means of detachable mounting for molds so that they may be readily interchanged when the lug pins 45 are swung upwardly to permit the ends of the mold hinge pins 29 to be withdrawn from the bosses 47, and the lugs 146 and 149 to be drawn from their channel seats 147 and 148. Under normal conditions the springs 41 will act upon the levers 40 and exert a swinging pressure upon the levers 42 which will tend to maintain the mold sections in closed relation to each other. Referring to Fig. 7 of the drawings it will be seen that the conveyor sprockets 20 and 24 and the chain 26 are diagrammatically indicated as being enclosed within a housing which is divided by a central partition 94' to form the upper portion within which the molds are filled and a lower tunnel 94 within which the filled molds are chilled. In order to maintain the complete apparatus in a properly cooled atmospheric condition a refrigerating unit 150 is provided which introduces chilled air to the tunnel 94 through a conduit 151 and draws off the atmosphere of higher temperature through the conduit 152.

It will thus be seen that the machine here disclosed provides efficient mechanical means for forming confections and the like having an outer shell of material which is solid at normal temperatures and which shell is filled with a material requiring low temperatures for its preservation, and it will further be evident that the machine here disclosed is quite simple in its construction, will operate substantially automatically, and is so designed as to make it readily possible to interchange the molds which are used.

While we have shown the preferred form of our invention, as now known to us, it will be understood that various changes may be made in combination, construction, and arrangement of parts by those skilled in the art without departing from the spirit of our invention as claimed.

Having thus described our invention, what we claim and desire to secure by Letters Patent is:

1. In a device of the character described, a pair of endless conveyor chains in spaced parallel vertical planes, a mold suspended between said chains and being formed in two complementary halves one of which is pivoted on an axis transversely of the path of travel of the conveyor chains, a filling station to which said mold is carried while held in its closed position, means for inverting the mold after it has been filled and means disposed adjacent the path of travel of said mold and conveyor and acting upon the mold to cause the pivoted mold half to swing vertically and the other mold half to lift so that the halves will move apart as the conveyor advances and whereby the mold will be opened and the article therein will fall free therefrom and to thereafter close the same, and means for inverting the mold prior to filling the same.

2. In a device of the class described, a pair of parallel conveyor chains, cross frames connecting said chains, a mold unit detachably mounted in said cross frames, and means whereby the mold unit with its cross frame may be rotated to predetermined positions as they are advanced by the conveyor chain, said mold unit being formed of two complementary members hinged together at one edge, and means whereby said mold sections may be caused to swing oppositely and around their hinge independently of their rotation with relation to the axis of the cross frame as the mold advances with the conveyor chain.

3. In a device of the class described, an endless conveyor chain, a mold carried thereby and having an opened end presented uppermost, a filling hopper to and away from which the mold is carried by the conveyor, a nozzle extending downwardly from said hopper, means operating in synchronism with the endless conveyor chain for flexing the chain and lifting the mold with relation to the nozzle and causing the end of the nozzle to project within the end of the mold, and means for centering the mold with relation to the nozzle as it is raised.

4. In a device of the class described, an endless conveyor, a mold carried thereby and having an opened end extending uppermost, a filling hopper to and away from which the mold is carried by the conveyor, a nozzle extending downwardly from said hopper, means operating in synchronism with the endless conveyor for lifting the mold with relation to the nozzle and causing the end of the nozzle to project within the end of the mold, and means disposed adjacent the nozzle to scrape the top of the mold and clear surplus material deposited thereon as the mold moves away from the nozzle.

5. In a filling device of the character described, a pair of endless conveyor chains disposed in spaced parallel vertical planes, a transversely disposed frame member supported between said chains and advancing therewith, trunnions pivotally mounting said frame member with relation to the chains upon which it is supported, a gear member carried by one of said trunnions and by which the frame may be rotated, means disposed along the path of travel of said conveyor chains and said gear member to be engaged by the gear member and to partially and positively rotate the frame a desired degree of rotation while the conveyor chains advance, a pair of mold sections pivoted together along a horizontal pivotal axis adjacent one edge of said sections and carried by the frame member, a cam track disposed along the path of travel of the conveyor, a cam roller carried by the frame and whereby the frame and its molds may be bodily rotated, a second cam track disposed along the path of travel of the frame and a cam roller carried by one of the mold sections and whereby said section may be swung to open and closed positions with relation to the other mold section.

6. In a filling device of the character described, a pair of endless conveyor chains disposed in spaced parallel vertical planes, a transversely disposed frame member supported between said chains and advancing therewith, trunnions pivotally mounting said frame member with relation to the chains upon which it is supported, a gear member carried by one of said trunnions, and by which the frame may be rotated, means disposed along the path of travel of said conveyor chains and said gear member to be engaged by the gear member and to partially and positively rotate the frame a desired degree of rotation while the conveyor chains advance, a pair of mold sections pivoted together along a horizontal pivotal axis adjacent one edge of said sections and carried by the frame member, a cam track disposed along the path of travel of the conveyor, a cam roller carried by the frame and whereby the frame and its molds may be bodily rotated, a second cam track disposed along the path of travel of the frame and a cam roller carried by one of the mold sections and whereby said section may be swung to open and closed positions with relation to the other mold section, and another cam track along which the cam roller of the frame moves while out of engagement with the first named cam track and by which the frame and molds carried thereby will be held in a temporarily aligned position with relation to the conveyor chain, and spring means normally holding the mold sections closed.

7. In a device of the character described a mold unit including a rigid transversely disposed frame, conveyor chains adjacent the opposite ends of said frame, means mounting the frame upon the conveyor chains for rotational movement upon an axis transversely of the chains, a mold structure comprising complementary mold halves pivotally connected together along one of their transverse edges, means detachably mounting one of said mold halves upon said transverse frame to be rigidly secured therewith, means disposed along the path of travel of the conveyor chains whereby the supporting frame will be rotated a predetermined degree as the chains and the mold unit advance, and other means whereby the free mold half and the relatively fixed mold half may swing with relation to each other to opened and closed positions during the aforesaid period of advance.

8. In a device of the character described a mold unit including a rigid transversely disposed frame, conveyor chains adjacent the opposite ends of said frame, means mounting the frame upon the conveyor chains for rotational movement upon an axis transversely of the chains, a mold structure comprising complementary mold halves pivotally connected together along one of their transverse edges, means detachably mounting one of said mold halves upon said transverse frame to be rigidly secured therewith, means disposed along the path of travel of the conveyor chains whereby the supporting frame will be rotated a predetermined degree as the chains and the mold unit advance, and other means whereby the free mold half and the relatively fixed mold half may swing with relation to each other to opened and closed positions during the aforesaid period of advance, and means disposed along the path of travel of said conveyor chains whereby said frame and the closed mold carried thereby may be rotated to an inverted position and restored to a normal position as the chains and mold unit advance.

JAMES FREDERICK ENGLAND.
JOHN B. LOMASNEY.